(12) United States Patent
Turmeau et al.

(10) Patent No.: US 11,168,720 B2
(45) Date of Patent: Nov. 9, 2021

(54) CONNECTING ASSEMBLY COMPRISING A CONNECTING PIECE AND AT LEAST TWO BEARERS

(71) Applicant: SKF Aerospace France S.A.S, Montigny-le-Bretonneux (FR)

(72) Inventors: Arnaud Turmeau, Valence (FR); Florian Bardy, Lons-le-Saunier (FR); Florent Fauchery, Montmeyran (FR); Anthony Jerome, Valence (FR); Nicolas Marotel, Portes lès Valence (FR); Noemie Peron, Valence (FR)

(73) Assignee: SKF Aerospace France S.A.S, Montigny-le-Bretonneux (FR)

( * ) Notice: Subject to any disclaimer, the term of this patent is extended or adjusted under 35 U.S.C. 154(b) by 159 days.

(21) Appl. No.: 16/417,774

(22) Filed: May 21, 2019

(65) Prior Publication Data
US 2019/0368521 A1    Dec. 5, 2019

(30) Foreign Application Priority Data
May 31, 2018   (FR) ...................................... 1854737

(51) Int. Cl.
*F16B 5/02* (2006.01)
*B64C 1/00* (2006.01)

(52) U.S. Cl.
CPC .................. *F16B 5/02* (2013.01); *B64C 1/00* (2013.01); *Y10T 428/24174* (2015.01)

(58) Field of Classification Search
None
See application file for complete search history.

(56) References Cited

U.S. PATENT DOCUMENTS 10,641,303 B2 *   5/2020   Fauchery .............. F16B 11/006
2017/0284435 A1   10/2017   Fauchery et al.

FOREIGN PATENT DOCUMENTS

| CA | 2281130 A1 | 6/2000 |
| EP | 2417020 A2 | 2/2012 |
| EP | 2474747 A1 | 7/2012 |
| EP | 2379313 B1 | 3/2014 |
| FR | 2970432 A1 | 7/2012 |
| FR | 2965594 B1 | 10/2012 |
| WO | 2007128997 A1 | 11/2007 |
| WO | 2012098333 A1 | 7/2012 |

* cited by examiner

*Primary Examiner* — Alexander S Thomas
(74) *Attorney, Agent, or Firm* — Garcia-Zamor Intellectual Property Law; Ruy Garcia-Zamor; Bryan Peckjian

(57) ABSTRACT

Connecting assembly providing a connecting piece made of composite material having a base and a main wall, the base having holes to accept second fixing elements, at least two bearers each pierced with a through orifice and each intended to be associated with one of the second fixing elements. The bearers being positioned one on each side of the main wall. The main wall and the base being connected by extensions of curved shape one on each side of the main wall. The extensions each defining a bearer receiving zone. The holes for accepting second fixing elements being formed in part through the curved extensions.

2 Claims, 4 Drawing Sheets

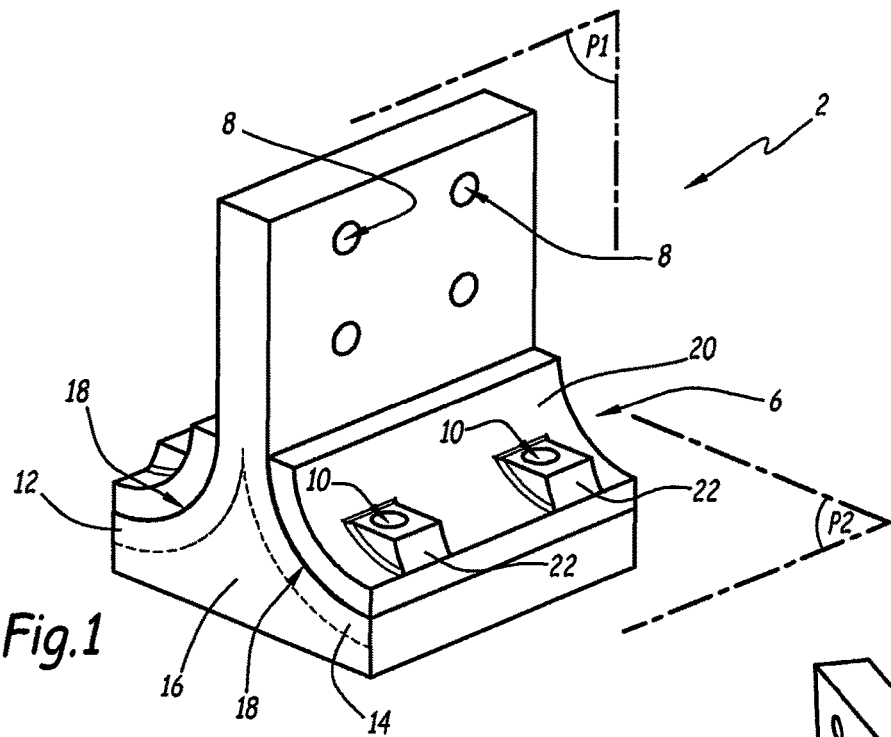
Fig.1
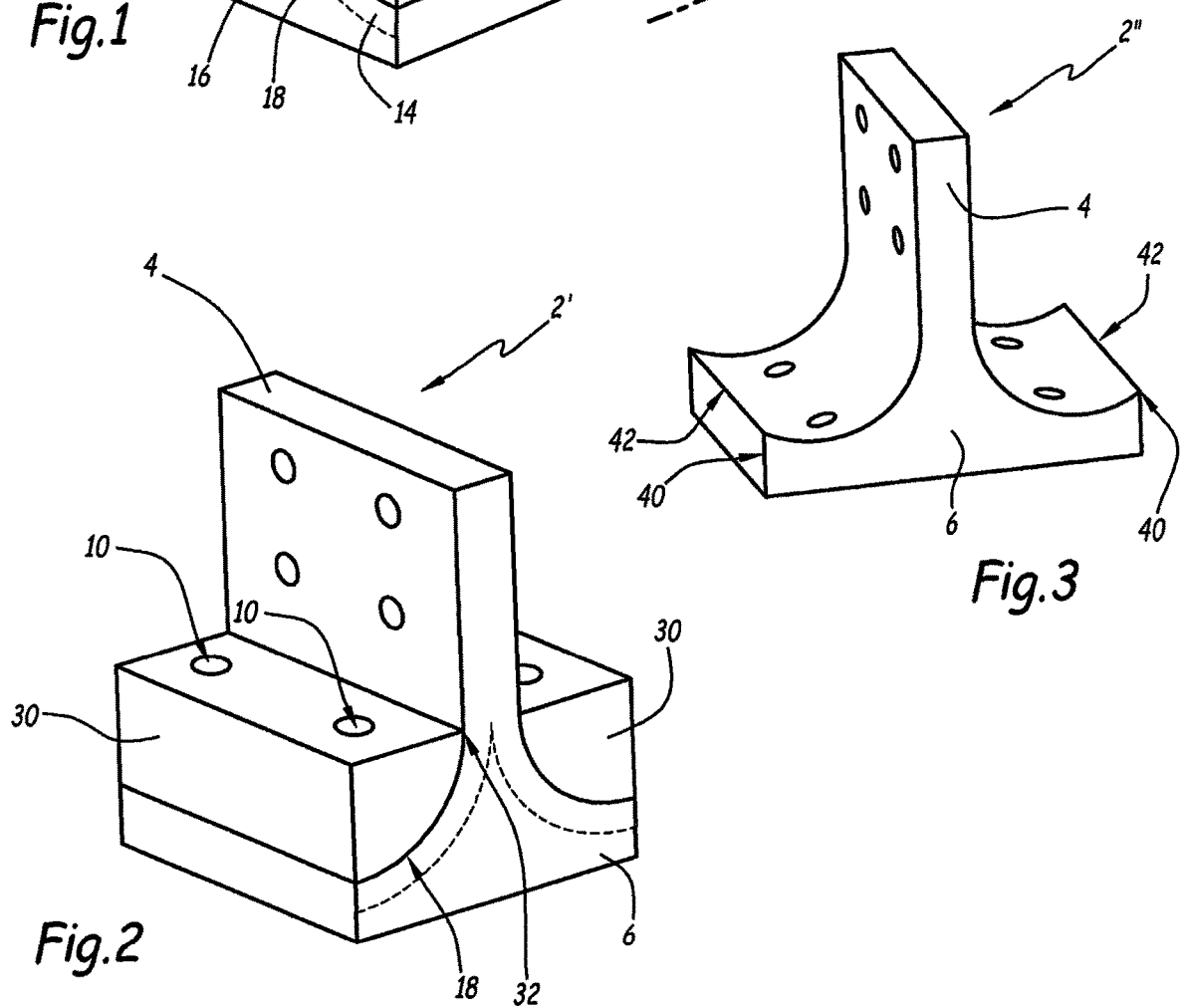
Fig.2
Fig.3

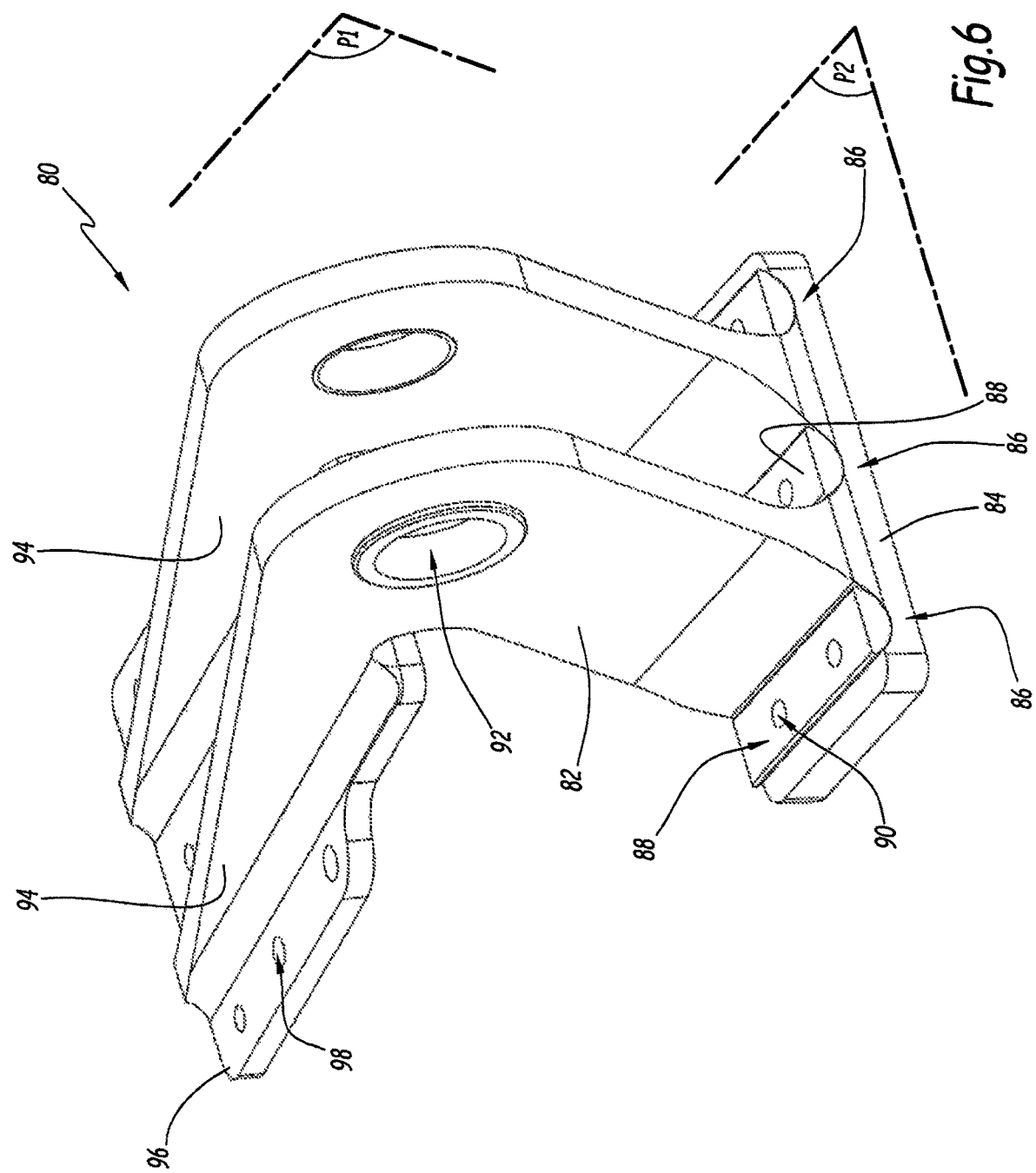

CONNECTING ASSEMBLY COMPRISING A CONNECTING PIECE AND AT LEAST TWO BEARERS

CROSS-REFERENCE TO RELATED APPLICATIONS

This application claims priority to Italian patent application no. 1854737 filed on May 31, 2018, the contents of which are fully incorporated herein by reference.

FIELD OF THE INVENTION

The present invention relates to a connecting assembly comprising a connecting piece and at least two bearers.

BACKGROUND OF THE INVENTION

FR 2970432 A1 discloses a T shaped connecting piece intended to fix two elements together, for example with a view to assembling mechanical components within aeronautical equipment. The connecting piece is made of composite material containing reinforcing FIBERS embedded in a resin matrix. The use of a composite material makes it possible to obtain good structural performance while at the same time limiting the mass of the component, something which is important in aeronautic applications, but has the disadvantage of encouraging certain mechanical failure modes. In particular, when the component is loaded in tension on the vertical main portion, the resin matrix is likewise locally loaded in tension, notably at the join to the base, and this encourages premature breakage of the component.

The invention therefore seeks to reduce these disadvantages still further by proposing a connecting assembly comprising a connecting piece and at least two bearers.

SUMMARY OF THE INVENTION

To this end, the invention relates to a connecting assembly, characterized in that it comprises:

a connecting piece made of composite material comprising a base and a main wall projecting from an upper face of the base in a first geometric plane, the base extending in a second geometric plane essentially perpendicular to the first plane, defining two opposing branches one on each side of the main wall, the main wall comprising an opening to accept a first fixing element, the base comprising holes to accept second fixing elements;

at least two bearers each pierced with a through orifice and each intended to be associated with one of the second fixing elements, the bearers being positioned one on each side of the main wall;

the main wall and the base being connected by extensions of curved shape one on each side of the main wall, the extensions each defining a bearer receiving zone, the holes for accepting second fixing elements being formed in part through the curved extensions.

By virtue of the invention, the use of bearers makes it possible to spread the load exerted by the connecting piece on the base, particularly when the connecting piece is loaded in tension on its main wall. Thus, the resin matrix situated at the join is then loaded in compression rather than being loaded in tension, which is a form of loading it is better able to withstand.

According to advantageous but noncompulsory aspects of the invention, such a connecting assembly may incorporate one or more of the following features, considered in isolation or in any technically permissible combination:

the radius of curvature of each extension connecting the main wall to the base is comprised between 5 cm and 30 cm.

Each receiving zone is shaped to accept a bearer of cylindrical or partially cylindrical shape.

The receiving zone is formed by hollow housings formed in the base of the connecting piece and formed at least in part by the curved extensions, each hollow housing having a rounded and concave shape and being intended to accept a bearer of hemispherical shape.

The hollow housings situated on the one same side of the main wall are separated from each adjacent housing by a boss of convex shape.

The main wall comprises a vertical boss on each of its main faces.

Each vertical boss continues as far as the convex boss that separates the hollow housings.

Each receiving zone is extended by a curved rim forming an end stop preventing the bearer from slipping.

The connecting piece comprises a secondary wall, joined to the free end of the main wall and extending perpendicular to the first geometric plane.

The connecting piece comprises several analogous main walls each connected to the base by curved extensions.

BRIEF DESCRIPTION OF THE SEVERAL VIEWS OF THE DRAWING

The invention will be better understood, and further advantages thereof will become more clearly apparent in the light of the following description of one embodiment of a connecting assembly which is given solely by way of example and with reference to the attached drawings in which:

FIG. 1 is a schematic depiction of a connecting assembly according to a first embodiment of the invention;

FIG. 2 is a schematic depiction of a connecting assembly according to a second embodiment of the invention;

FIG. 3 is a schematic depiction of a connecting assembly according to a third embodiment of the invention;

FIG. 6 is a schematic depiction of a connecting assembly according to a fifth embodiment of the invention.

DETAILED DESCRIPTION OF THE INVENTION

Figure 4:
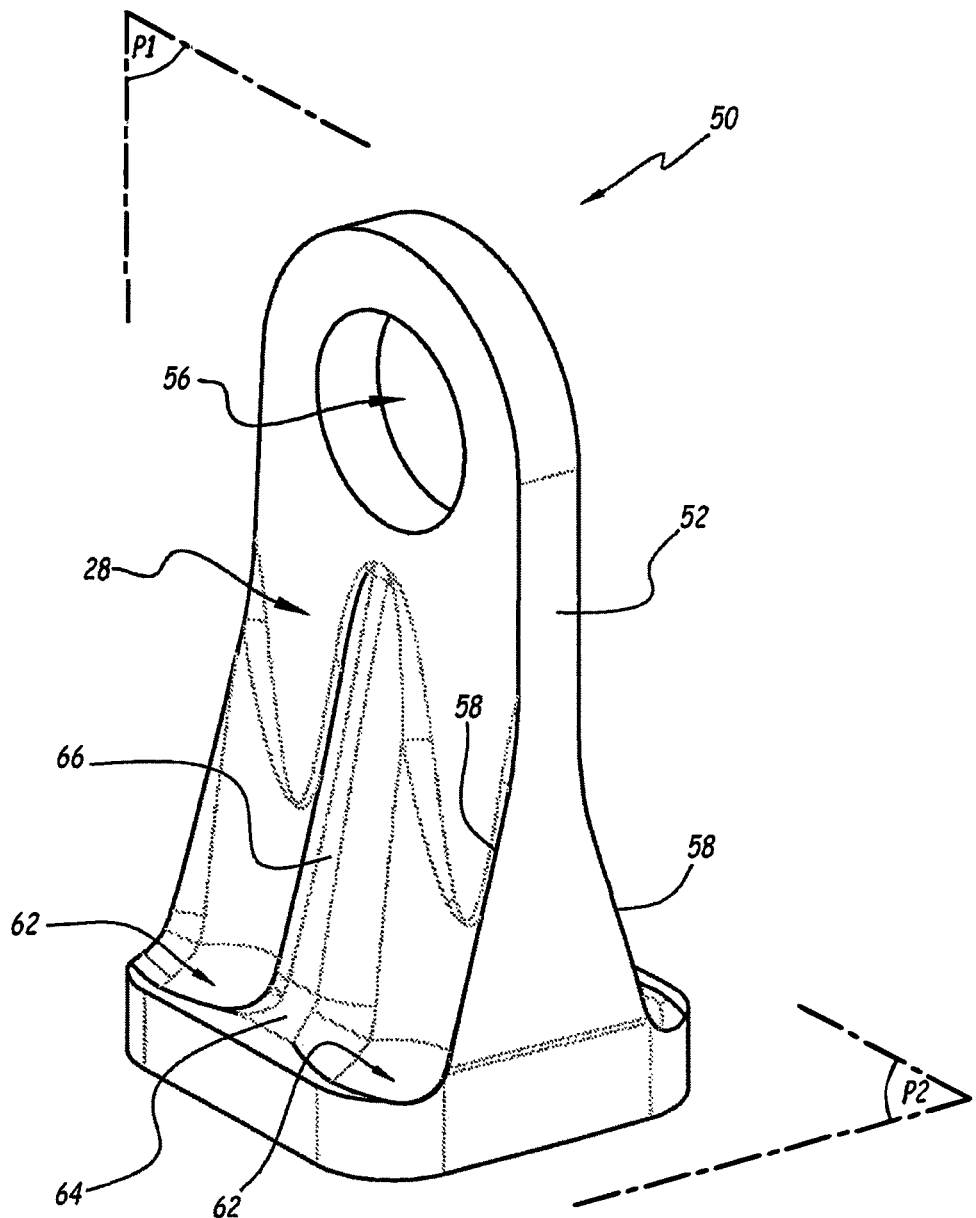
FIGS. 4 and 5 are schematic depictions of a connecting assembly according to a fourth embodiment of the invention.

FIG. 1 depicts one embodiment of a connecting assembly which comprises a connecting piece 2, or bracket, comprising a main wall 4 and a base 6.

For example, the connecting piece 2 is intended to fix together two elements, in this instance with a view to assembling mechanical components within aeronautical equipment.

The main wall 4, also referred to as the web, projects out from an upper face of the base 6, in a first geometric plane P1, between a first end which is anchored to the base 6 and a second end, referred to as a "free" end, that forms an upper part of the component 2.

The base 6 extends in a second geometric plane P2 essentially perpendicular to the first plane P1 and defining two opposing branches or portions which extend out one on each side beyond the main wall 4. For example, the base 6 here has the form of a solid one piece component.

What is meant here by "essentially perpendicular" is that the acute angle between the planes P1 and P2 is comprised between 30° and 90° inclusive, preferably between 45° and 90°, more preferably still between 60° and 90° inclusive.

Thus, the connecting piece 2 has a cross section in the overall shape of an inverted T, the main wall 4 forming the main branch of the T.

In the example illustrated, the main wall 4 extends vertically and the base 6 extends horizontally, so that the plane P1 in this case forms a plane of symmetry of the component 2.

The upper edge corners bordering the main faces of the wall 4 are in this instance parallel to the edge corners of the base 6.

The main wall comprises at least one through opening 8 to each accept a first fixing element. Here there are four openings 8 but, as an alternative, the number of openings 8 may differ. The opening or openings 8 are preferably formed in the free part of the wall 4.

The first fixing elements allow the main wall 4 to be secured to a first mechanical element, not illustrated. For example, the first fixing elements are screws or bolts and, in this instance, comprise a shank, notably a threaded shank. Each shank is housed in an opening 8. Alternatively, the first fixing element or elements are mechanical fasteners, for example a ball.

The base 6 comprises holes 10 to accept second fixing elements. In this example, two holes 10 are formed on each lateral portion of the base 6. The second fixing elements allow the main wall 4 to be secured to a second mechanical element, not illustrated. For example, the second fixing elements are screws or bolts and comprise a shank, notably a threaded shank, housed in an opening 10.

The component 2 is made of composite material containing reinforcing FIBERS embedded in a polymer matrix, notably a resin matrix.

In the example illustrated, the main wall 4 comprises two expanses 12 and 14 forming opposing main faces of the wall 4. The expanses 12 and 14 are connected in a free upper part of the wall 4 and here form opposing parallel planar faces of the wall 4. Descending towards the base 6, the expanses 12 and 14 diverge away from one another until they come into contact with the base 6.

For example, the wall 4 is formed from two flexible sheets comprising a stack of a multitude of laminated layers of plies or layers of a resin impregnated fibrous preform, preferably a fibrous preform with anisotropic or unidirectional orientation, each sheet forming one of the expanses 12 and 14. The space between the expanses 12 and 14 is filled with a core 16 of the component 2, which is likewise made from a composite material and partially forms the base 6. Thus, the component 2 has no hollow cavity between the expanses 12 and 14.

The main wall 4 and the base 6 are connected by curved extensions 18, also referred to as joining portions, which each define a receiving zone for a bearer 20. The holes 10 to accept second fixing elements are partially formed through the extensions 18.

The extensions 18 here have a curved profile and an exterior surface of concave shape.

For example, the geometric projection of the extensions 18 in a geometric plane perpendicular to the planes P1 and P2 has the shape of an arc of a circle the center of which is situated towards the outside of the component 2.

In the example illustrated, the extensions 18 are formed on each side of the wall 4 by the divergent parts of the expanses 12 and 14.

Advantageously, the radius of curvature of each extension 18 is comprised between 5 cm and 30 cm inclusive, is preferably comprised between 10 cm and 25 cm inclusive. For example, the radius of curvature is measured in the plane perpendicular to the planes P1 and P2.

For example, the radius of curvature is chosen according to the curvature of the contact faces of the bearers 20. In particular, in this instance, for each extension 18, the curved part of the bearer 20 is in contact with the receiving zone and is tangential to the direction in which the corresponding face of the wall 4 extends.

The connecting assembly further comprises at least one bearer 20, here two of them, each housed in a corresponding receiving zone of the component 2. The bearers 20 are identical here, which means that just one of them is described in detail.

In general, a bearer 20, also referred to as a "washer" refers here to a mechanical element which is intended to collaborate with one of the second fixing elements, for example by being interposed between the receiving zone and a head of the corresponding second fixing element, so as to spread the mechanical load experienced by the component 2, notably when the component is loaded in tension on its wall 4 while being fixed to the second element. The bearers 20 here form part of the connecting assembly.

The bearer 20 is pierced with through holes which are aligned with the holes 10 when the bearer 20 is mounted on the component 2 and which here are perpendicular to the longitudinal axis of the bearer 20. However, in practice, a level of misalignment may be tolerated in order to compensate for potential assembly clearances. The diameter with which the hole 10 is drilled may differ from the diameter with which the corresponding hole formed in the bearer 20 is drilled.

In this example, the bearers 20 are cylindrical or at least partially cylindrical in shape, for example have the shape of a portion of a cylinder, notably a hollow quarter cylinder.

The term "portion of a cylinder" may for example refer to a cylinder that has been cut along its longitudinal plane, for example truncated along a chord of its generatrix, notably to form a quarter cylinder or a half cylinder, so that the base of the bearer 20 has the shape of a portion of a disc, notably the shape of a quarter disc in the case where the bearer is a quarter cylinder and the generatrix has a circular shape. The generatrix may as an alternative have the shape of an ellipse or of an oblong.

Each bearer 20 is lying down in a receiving zone, the longitudinal axis of the bearer 20 being aligned along the second plane P2. Thus, the cylindrical exterior face of each bearer 20 is in contact with the receiving zone.

The bearers 20 are made of a metallic material here but, as an alternative, may be made of a plastics material or of a composite material.

The bearers 20 make it possible to spread the load exerted on the base 6, notably when the component 2 is loaded in tension on its main wall 4. Thus, when the component 2 is loaded in tension on its main portion 4, the resin situated at the join 18 is loaded in compression rather than being loaded in tension, which is a loading mode that it is better able to withstand. The mechanical integrity of the component 2 is thus improved.

Optionally, additional bearers 22 may be used to supplement each bearer 20.

FIG. 2 depicts a connecting assembly 2' according to a second embodiment. Those elements of this connecting assembly which are analogous to the first embodiment bear the same references and are not described in detail, in so far as the above description can be reapplied to them.

The assembly 2' notably differs from the connecting assembly of FIG. 1 in that the bearers 20 are replaced by solid cylindrical bearers 30, here in the shape of a solid quarter cylinder. The reference 32 refers to the upper end of the contact zone formed by the curved extension 18. By virtue of this arrangement, the pressure applied by the bearers 30 is increased.

FIG. 3 depicts a connecting piece 2" of a connecting assembly according to a third embodiment of the invention. Those elements of this connecting piece which are analogous to the component 2 bear the same references and are not described in detail, in so far as the above description can be reapplied to them.

The component 2" notably differs from the component 2 in that the curved extensions 18 end in a turned up curved portion 40 which forms an end stop 42 away from the main part 4.

This arrangement prevents the bearers 20 or 30 from slipping out of the receiving zone during phases of assembly of the connecting assembly and also when the component 2 is loaded. Specifically, in the event of loading on the wall 4, the expanses 2 and 14 have a tendency to be moved away from the base 6 at the bearers 20, which may cause undesirable movement of the bearers 20 if there is an assembly clearance. The end stop 42 therefore allows the washer to be held in place, improving the reaction of load by the base 6.

Figure 5:
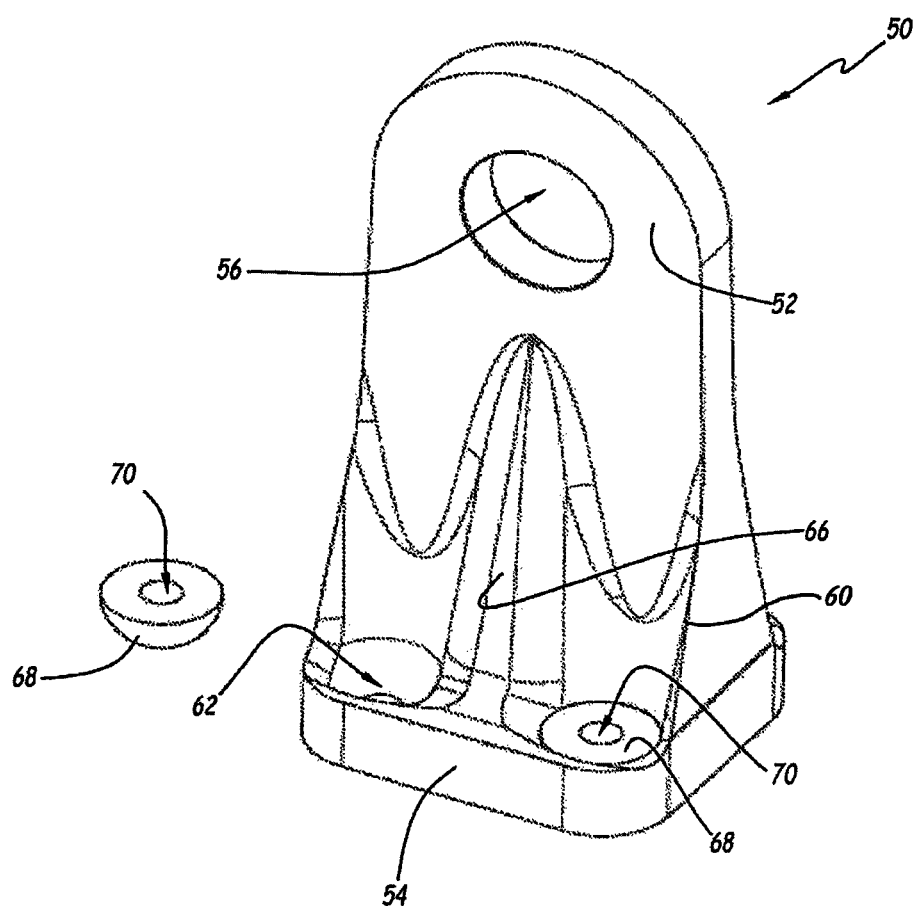

FIGS. 4 and 5 depict a connecting assembly according to a fourth embodiment of the invention, which comprises a connecting piece 50 made of composite material, analogous to the component 2, for which the above description can be reapplied, with the exception of the differences in shape.

In particular, the component 50 comprises a main wall 52, also referred to as web, which extends out in a first geometric plane P1 from an upper face of a base 54 of the component 50, between a first end anchored to the base 54 and a free end that forms an upper part of the component 50. The free end of the wall 52 here has the shape of an arc of a circle or, more generally, a curved shape.

The base 54 extends in a second geometric plane P2 essentially perpendicular to the first plane P1 and defining two opposing branches one on each side of the main wall. The component 50 here also has a T shaped cross section. The plane P1, which here is vertical, forms a plane of symmetry of the component 50.

The wall 52 comprises a single through opening 56, here formed to accept a first fixing element of the ball swivel type, although as an alternative the number of openings 56 may differ.

The main wall 52 comprises two opposing main faces 58 of essentially planar shape, which in this instance are parallel in the upper part of the wall 52 and which, in the lower part of the wall 52, for example from mid-way down the wall 52, diverge away from one another towards the outside of the component 50 until they come into contact with the base 54. For example, the wall 52 is formed of flexible sheets comprising a stack of a multitude of laminated layers of plies or layers of a resin impregnated fibrous preform, in a similar way to the expanses 12 and 14.

The main wall 52 and the base 54 are joined by curved extensions 60 which each define a receiving zone for a hemispherical bearer 68, called upon to perform a similar function to the bearers 20 or 30. One or more holes, not illustrated, are formed through the base 54 in each receiving zone to accept second fixing elements.

In the example illustrated, the faces 58 have a rectilinear slope when they diverge from one another and the extensions 60 are formed in the region of the housings 62, for example forming a V shaped profile when viewed in a plane perpendicular to the planes P1 and P2. The part of the wall 52 and therefore of the component 50 that lies between the divergent faces 58 is filled by a core of the component 50, likewise made from a composite material and being joined to the upper face of the base 54. Thus, the component 50 has no hollow cavity between the faces 58.

Advantageously, the radius of curvature of each extension 60 is comprised between 5 cm and 30 cm inclusive, preferably is comprised between 10 cm and 25 cm inclusive.

In the example illustrated, the receiving zone is formed by hollow housings 62 formed in the base 54 of the component 50 and at least in part formed by the extensions 60. Each hollow housing 62 has a rounded and concave shape and is intended to accept a bearer 68 of hemispherical shape.

Advantageously, the hollow housings 62 situated on the one same side of the main wall 52 are separated from each adjacent housing 62 by a convex boss 64. More specifically, on each side of the main wall 52, the adjacent housings 62 situated on the same side of the wall 62 are separated one from the next by a boss 64.

In the example illustrated, the component 50 comprises two housings 62 on each side of the wall 52. The component 50 may, as an alternative, comprise a different number of housings 62, for example three or four housings 62, on each side of the wall 52.

For preference, the main wall 52 comprises on each of its main faces a vertical boss 66 which projects from the said main face.

Each vertical boss 66 here extends essentially vertically along the corresponding main face.

For example, each vertical boss 66 continues as far as the boss 64 that separates the hollow housings.

In the example illustrated, the component 50 comprises two bosses 66 each one formed on one of the opposing main faces of the wall 52. The vertex of each boss 66 is situated in this instance below the opening 56.

Each bearer 68 of hemispherical shape comprises a rounded contact face in the shape of a half ball or spherical cap, and an essentially flat face. The curvature of the rounded face complements the curvature of the housing 62.

Each bearer 68 is pierced with a through hole 70 extending between the essentially flat face on the one hand and the vertex of the rounded face on the other. When a bearer 68 is housed in a corresponding housing 62, the hole 70 is aligned with the corresponding hole formed in the housing 62.

The bearers 68 are made for example of a metallic material but, as an alternative, could be made of a plastics material or of a composite material.

FIG. 6 depicts a connecting assembly according to a fifth embodiment. Those elements of this connecting assembly which are analogous to the previous embodiments bear the same references and are not described in detail, in so far as the above description can be reapplied to them.

The connecting assembly comprises a connecting piece 80 made of composite material as described hereinabove, the component 80 performing a similar function to the components 2 and 50 to provide mechanical connection between first and second elements. The component 80 here also allows the attachment of a third element in addition to the first and second elements, as explained hereinafter.

The component 80 here comprises two walls 82, here identical to one another and analogous to the walls 4, and a flat base 84 from which the walls 82 extend. The walls 82 extend parallel to a plane P1 and the base 84 extends essentially parallel to a plane P2, these planes being analogous to the planes P1 and P2 defined hereinabove.

The junction zones connecting the base 84 to each wall 82 are formed by curved extensions 86 analogous to the extensions 18 or 60 and which define receiving zones for bearers 88 belonging to the connecting assembly. The bearers 88 here are in the shape of a cylinder or cylinder portion.

In the example illustrated, the component 80 comprises three receiving zones, each defining a housing of cylindrical shape elongated parallel to the junction between the base 84 and one of the walls 82. Each receiving zone accepts a bearer 88, here in the form of a half cylinder, the longitudinal axis of which is elongate parallel to the plane P2.

The base 84 comprises holes to accept the second fixing elements as defined hereinabove. The bearers 88 likewise comprise through holes 90 which are aligned with the through holes in the base 84 when the bearers 88 are mounted on the component 80. Each wall 82 here comprises at least one orifice 92 performing the same function as the orifices 8 or 56 to accept one of the first fixing elements defined hereinabove.

In the example illustrated, the component 80 further comprises a secondary wall 96, joined to the free end 94 of each main wall 82 and here extending perpendicular to the first geometric plane P1.

The secondary wall 92 further comprises holes 98 to accept third fixing elements, which are for example analogous to the first or second fixing elements, and allowing the secondary wall 96 to be secured to the third element.

Numerous other forms of embodiment are possible.

In particular, the shapes and configurations described in the above embodiments may be adapted to suit the applications for which the connecting assembly is intended, notably according to the nature and amplitude of the mechanical loadings applied to the connecting assembly when this assembly is connected to the various mechanical elements.

According to other examples, the secondary wall 96 may be used on a connecting piece that comprises just one wall 82 or several walls 82.

An unillustrated alternative form of the component 50 may comprise two independent bases 54 each one joined to a wall 52, the free ends of the walls 52 being joined to a secondary wall analogous to the wall 96 extending in the plane P1.

The embodiments and alternative forms envisaged hereinabove may be combined with one another to generate further embodiments.

What is claimed is:

1. A connecting assembly comprising:
   a connecting piece made of composite material providing a base and a main wall projecting from an upper face of the base in a first geometric plane, the base extending in a second geometric plane perpendicular to the first plane, defining two opposing branches one on each side of the main wall, the main wall including an opening to accept a first fixing element, the base comprising holes to accept second fixing elements,
   at least two bearers each pierced with a through orifice and each intended to be associated with one of the second fixing elements, the bearers being positioned one on each side of the main wall;
   the main wall and the base being connected by extensions of curved shape one on each side of the main wall, the extensions each defining a bearer receiving zone, the holes for accepting second fixing elements being formed in part through the curved extensions;
   wherein the connecting piece comprises a secondary wall, joined to the free end of the main wall and extending perpendicular to the first geometric plane.

2. A connecting assembly comprising:
   a connecting piece made of composite material providing a base and a main wall projecting from an upper face of the base in a first geometric plane, the base extending in a second geometric plane perpendicular to the first plane, defining two opposing branches one on each side of the main wall, the main wall including an opening to accept a first fixing element, the base comprising holes to accept second fixing elements,
   at least two bearers each pierced with a through orifice and each intended to be associated with one of the second fixing elements, the bearers being positioned one on each side of the main wall;
   the main wall and the base being connected by extensions of curved shape one on each side of the main wall, the extensions each defining a bearer receiving zone, the holes for accepting second fixing elements being formed in part through the curved extensions;
   wherein the connecting piece comprises several analogous main walls each connected to the base by curved extensions.

* * * * *